United States Patent Office 3,522,405
Patented Aug. 4, 1970

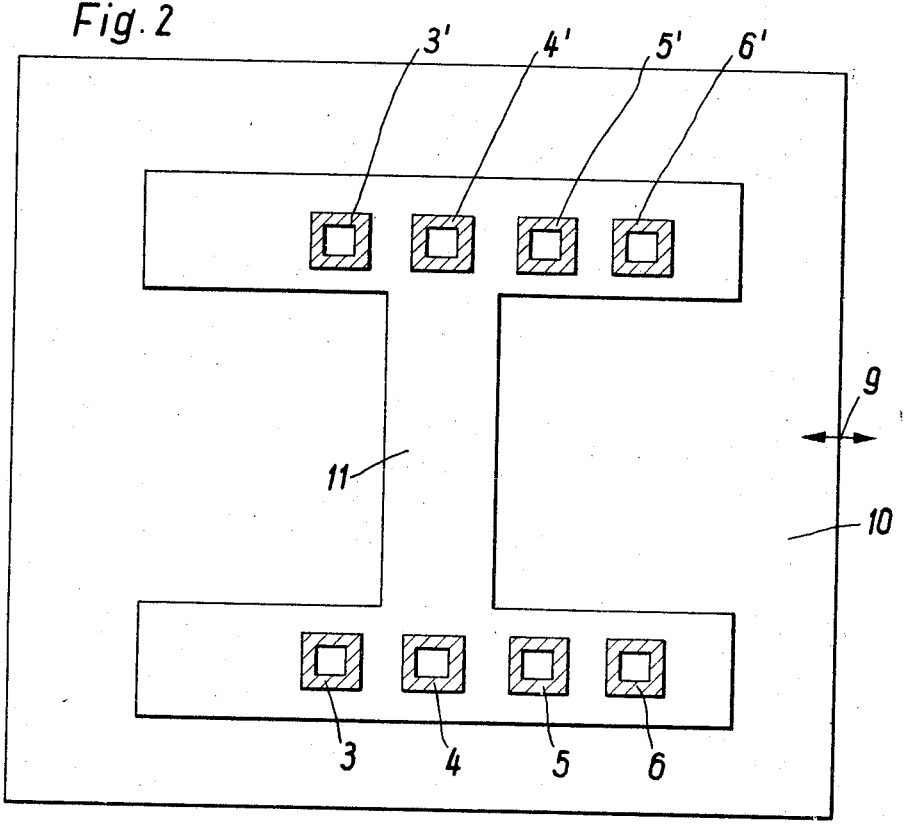
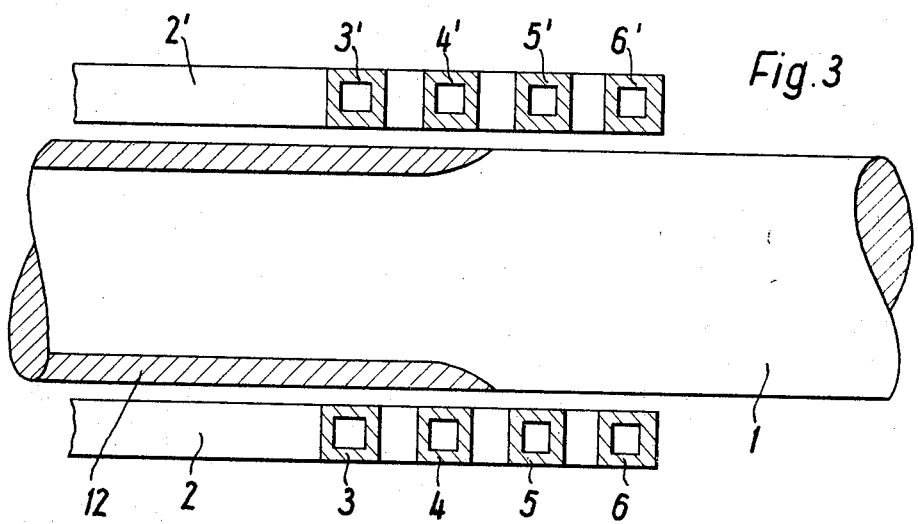

3,522,405
APPARATUS FOR INDUCTIVELY HEATING METAL WORKPIECES
Gerhard Seulen and Friedhelm Reinke, Remscheid, Germany, assignors to AEG-Elotherm G.m.b.H., Remscheid-Hasten, Germany
Filed May 28, 1968, Ser. No. 732,663
Claims priority, application Germany, Jan. 19, 1968,
A 57,982
Int. Cl. H05b 5/00, 9/02
U.S. Cl. 219—10.79                            16 Claims

ABSTRACT OF THE DISCLOSURE

The apparatus according to the invention provides means whereby workpieces of different lengths or different portions of the length of a single workpiece, may be heated, and whereby changes in the heating effect of the conductor loop to obtain such effects may be continuously effected; by forming a plurality of parallel bars on at least one of the branches which extend longituidnally of a workpiece so as to conform to the workpiece shape, the end of the parallel bar forming a tunnel, the heating effect of the conductor being controlled by movement of an element in the tunnel affecting the impedance in the said parallel bars.

---

Figure 1:
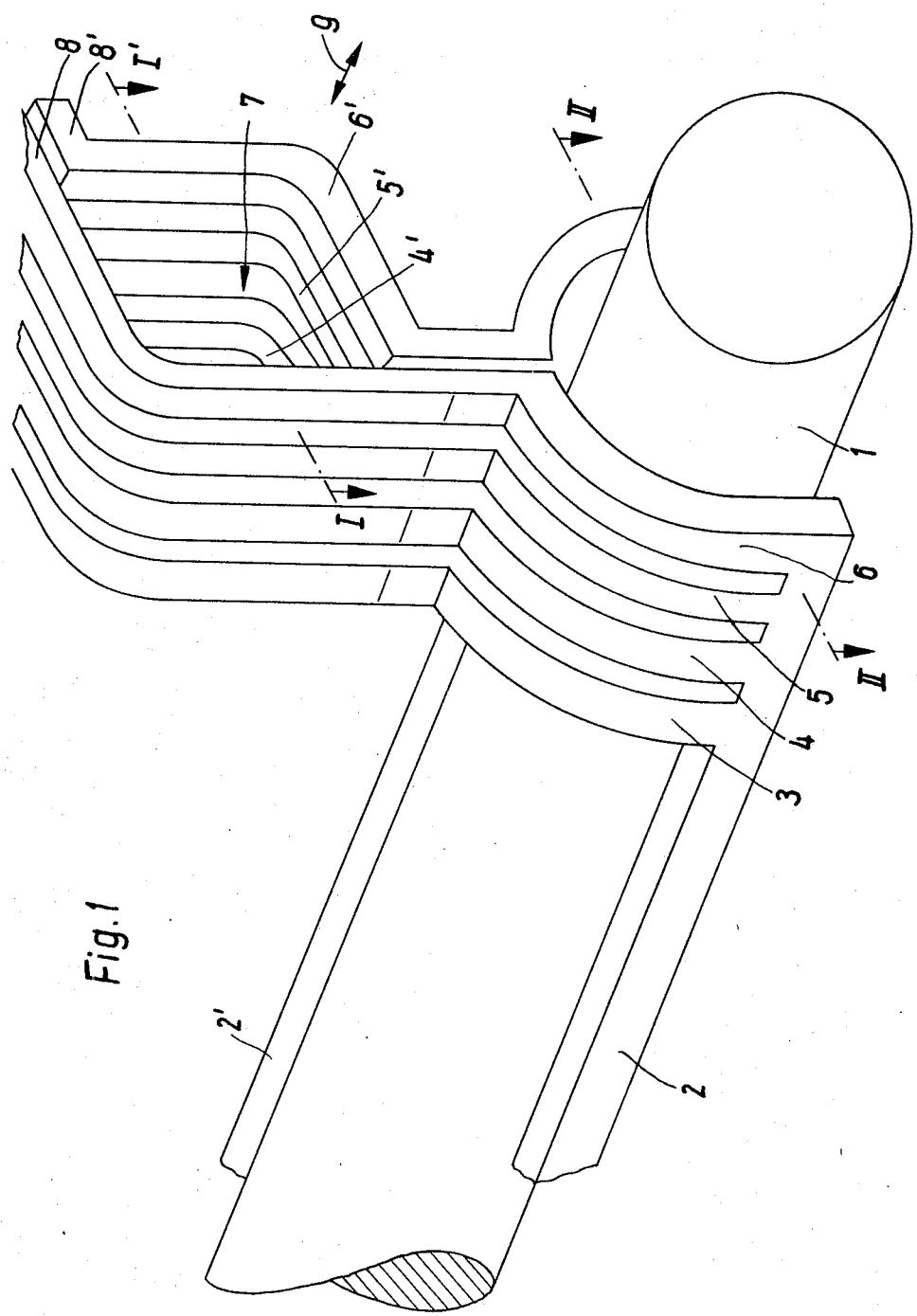

This invention relates to the inductive heating of workpieces of different overall lengths or of workpieces in which zones of different lengths are to be heated, with the aid of a minimum number of inductors and particularly relates to inductive heating apparatus for effecting such heating in which the adjustment to different heating lengths may be effected continuously if required. Workpieces heated according to the invention may thereafter be hot-worked, shaped or surface-hardened after quenching, as may be desired.

Apparatus according to the invention has advantages for example over an arrangement wherein an inductor loop comprises two relatively movable and electrically interconnected heating conductor loops, which arrangement gives rise to mechanical complications which are undesirable under the rough conditions of metal heating; or over an arrangement having an inductor loop in which terminal lugs are provided at equidistant intervals over the straight part of the loop for the selectable affixation thereto of a short-circuiting bridge, which arrangement has the defect that in practice the adjustment of the effective length of the inductor cannot be varied continuously, but only in steps.

Apparatus according to the invention provides means for adjusting the effective length of an inductor which comprises a closed heating conductor loop extending longitudinally on one side of a workpiece surface for the purpose of heating the metal workpiece as it revolves about its axis of symmetry, which conductor loop may be provided with two branches extending transversely of the work-piece axis. The characterizing feature of the conductor loop, is that at the end(s) of the loop whose effective heating length is to be varied, at least one of the transverse branches thereof is divided into a plurality of parallel bars, a first portion of the said parallel bars conforming together to the shape of the workpiece surface, and a second portion of the parallel bars together defining a tunnel adapted to receive an adjustably movable element which affects the impedance of the parallel bars forming the said tunnel when the said element is inserted therein. The said element may be an air-gapped core of magnetically low reluctance material or an adjustably movable ring of a material of high electrical conductivity.

Preferably both branches of the conductor are provided with a plurality of parallel bars as aforesaid, the second portions of each set of bars together defining the said tunnel.

In an embodiment of the invention, at least one of the said branches of the conductor is detachable and is affixable at a selectable point along the length of the conductor loop.

Preferably the core or ring should be arranged to be adjustably movable parallel to the workpiece axis.

The cross-section of said tunnel may be for instance circular or polygonal. The air-gapped core which may be used may be composed of one or several laminar metal sheets or of sintered soft magnetic pressings for into two or more separated members, which members may be adapted to move in the same or opposite directions with respect to each other.

In installations in which the inductor is connected to a current source which provides a high frequency A.C. current the conductor may be hollow to provide for the circulation of a coolant therethrough.

Adjustment can be further improved to attaching to one or both sides of the said branch or branches of the conductor loop at positions at the ends of the adjustability range, rings or discs of soft magnetic material conforming in shape to the said branch or branches.

Figure 4:
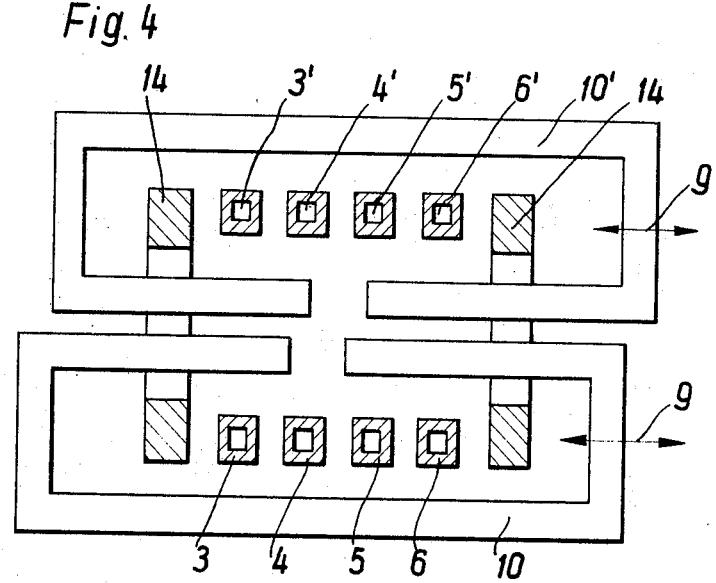
Figure 5:
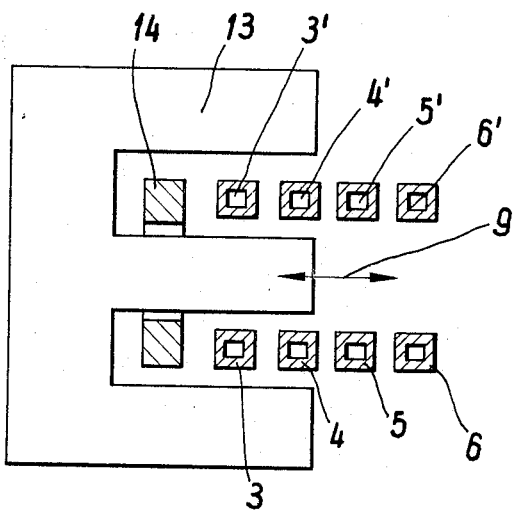
Figure 6:
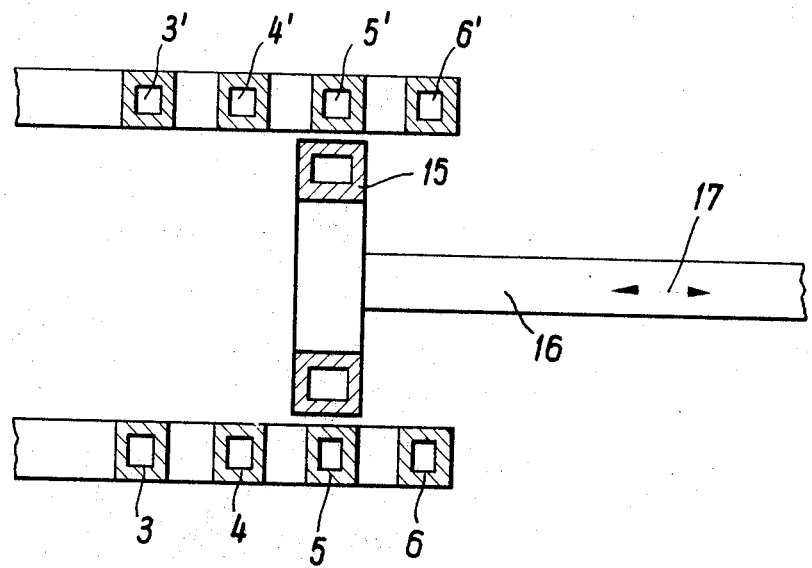

Embodiments of the invention are hereinafter described and illustrated by the accompanying drawings, of which
  FIG. 1 is a perspective representation of a heating conductor loop according to the invention,
  FIG. 2 is a section taken on the line I—I' of the apparatus according to FIG. 1,
  FIG. 3 is a section taken on the line II—II' of the apparatus according to FIG. 1,
  FIGS. 4 and 5 are sections corresponding to that of FIG. 2, of modified forms of magnetic core, and
  FIG. 6 is a section taken on the line I—I' of the apparatus shown in FIG. 1, after the insertion of an adjustably located ring.

Referring to the drawings, in FIG. 1 a cylindrical workpiece 1 that is to be inductively heated is shown in a heating position under a part of a closed conductor loop above the workpiece surface. According to conventional practice, the conductor loops comprise two straight branches 2 and 2' which extend parallel to the elongated workpiece and which are interconnected by two branches which extend transversely of the workpiece axis, and which may include the connections for the supply of the current. As shown in FIG. 1, one of the transverse branches may be divided to provide the connections for supplying the current.

In FIG. 1 the transverse branches, which in the embodiment illustrated include the current supply conductors, are formed in the manner according to the invention, in that they are subdivided into a plurality of parallel bars 3, 4, 5, 6 and 3', 4', 5', 6' which in a first portion in shape conform to the peripheral contour of the workpiece, and in a second portion define a tunnel indicated at 7.

In the illustrated embodiment the ends 8, 8' of the transverse branches are conductively connected, and they thus in the embodiment illustrated also form the connections for the supply of the current. If the current connections are located at some other point of the conductor loop, the corresponding bars, namely 3 and 3', 4 and 4', 5 and 5' and 6 and 6', should then be electrically directly interconnected. If necessary, the transverse branch at the other end of the conductor loop not shown in the drawing may be similarly constructed.

For the sake of clarity only the tunnel formed between the bars is shown. In operation, as will be understood from the section in FIG. 2, a core 10 of a magnetically low reluctance material may be inserted with clearance into the tunnel 7 in the direction indicated by the arrow 9. Instead of an adjustable magnetic core, an adjustable ring of a material of high electrical conductivity may be longitudinally displaceably inserted into the tunnel, in a direction parallel to the workpiece. For this purpose such a ring may be affixed to a suitable support such as a rod 16, as indicated in FIG. 6, said rod being movable in the direction of the arrow 17. In order to dissipate the heat generated in the ring the latter is preferably hollow to permit a liquid or gaseous coolant to be circulated through the cavity 18.

The air gap formed by the core 10 or the short circuiting ring 15 significantly affects the impedances in the parallel bars, 3, 4, 5, 6 and 3', 4', 5', 6' so that the flow of current will not extend beyond that conductor 3, 4, 5, 6 and 3', 4', 5', 6' at which the air gap or the short circuiting ring is situated. Thus during inductive heating the effect is as if the other conductors were absent.

The length of the heated zone 12 in FIG. 3, i.e. the effective length of the heating conductor loop can therefore be varied by moving the magnetic core. This arrangement which requires no contacts permits such adjustments to be made whilst heating proceeds.

In order to provide a more sensitive method of control the magnetic core, as shown in FIG. 4, may be divided into two separate members 10 and 10' for conducting the field, said members being movable together or in contrary directions indicated by the arrows 9. To some extent this disposition of the cores also permits the inductor current to be controlled and the electrical power provided by the inductor to be controllably varied.

In some applications a single E-core 13 as shown in FIG. 5 may be sufficient as a magnetic core. For reducing stray flux rings or discs 14 as indicated in FIGS. 4 and 5 consisting of a soft magnetic material may be provided alongside the bars, on only one or on both sides thereof.

The tunnel formed by the conductor branches according to the invention may be for example of circular or polygonal section.

What is claimed is:
1. Inductive heating apparatus for heating a workpiece, comprising a closed conductor loop having two branches extending transversely of a workpiece to be heated, in which at least one of the said branches is divided into a plurality of parallel bars, a first portion of the said bars conforming together to the shape of a workpiece over which they extend, and a second portion of the said bars together defining a tunnel; an adjustably movable core element of magnetically low reluctance which affects the impedance of the parallel bars forming the said tunnel when the said element is inserted therein; and means provided for moving the said element in the tunnel parallel to a longitudinal axis of a workpiece to be heated.

2. Apparatus according to claim 1, in which the said element is an air-gapped core of magnetically low reluctance.

3. Apparatus according to claim 2, in which the said core comprises at least two core elements, each core element being adapted for movement in the same or opposite directions to the other element(s).

4. Apparatus according to claim 2, in which the said core comprises at least one metal lamination.

5. Apparatus according to claim 2, in which the said core comprises one or more sintered soft magnetic pressings.

6. Apparatus according to claim 1, in which the same element is a hollow ring whereby a cooling fluid may be transported therethrough.

7. Apparatus according to claim 1, in which at least one of the said branches is detachable and adapted to be mounted at preselected point(s) along the length of a branch of the conductor extending longitudinally of a workpiece to be heated.

8. Apparatus according to claim 1, in which the cross-section of the tunnel is circular or polygonal.

9. Apparatus according to claim 1, in which the said conductor loop is hollow whereby a cooling fluid may be transported therethrough.

10. Apparatus according to claim 1, in which at least one of the said branches are provided with a ring or disc of soft magnetic material conforming with the shape of at least one of the said branches of the conductor loop.

11. Inductive heating apparatus for heating a workpiece comprising a closed conductor loop having two branches extending transversely of a workpiece to be heated, in which at least one of the said branches is divided into a plurality of parallel bars, a first portion of the said bars conforming together to the shape of a workpiece over which they extend, and a second portion of the said bars together defining a tunnel; an adjustably movable ring element of a material of high electrical conductivity which affects the impedance of the parallel bars forming the said tunnel when the said element is inserted therein, wherein said ring is always out of contact with the bars defining said tunnel; and means provided for moving the said element in the tunnel parallel to a longitudinal axis of a workpiece to be heated.

12. Apparatus according to claim 11, in which the said ring is hollow whereby cooling fluid may be transported therethrough.

13. Apparatus according to claim 11, in which at least one of the said branches is detachable and adapted to be mounted in preselected point(s) along the length of a branch of the conductor extending longitudinally of a workpiece to be heated.

14. Apparatus according to claim 11, in which the cross-section of the tunnel is circular or polygonal.

15. Apparatus according to claim 11, in which the said conductor loop is hollow whereby cooling fluid may be transported therethrough.

16. Inductive heating apparatus for heating a workpiece, comprising:
    a closed inductor loop having a pair of conductors extending axially of the workpiece to be heated and having a branch at each end of the loop extending transversely of the workpiece;
    at least one of said branches being divided into a plurality of parallel bars to provide a plurality of current paths connected in parallel, a first portion of the said parallel bars conforming together to the shape of the workpiece over which they extend, and a second portion of the said bars together defining a tunnel; and
    an element of magnetic or electrically conductive material adapted to be adjustably movable longitudinally within the said tunnel and out of contact with the sides of the said tunnel whereby the impedance of at least some of the said parallel bars and thence the current flowing therethrough is effected thereby varying the length of the heating zone defined between the said axial conductors.

References Cited
UNITED STATES PATENTS

| | | | |
|---|---|---|---|
| 2,597,237 | 5/1952 | Friend | 219—10.79 X |
| 2,647,200 | 7/1953 | Redmond | 219—10.79 X |
| 2,790,883 | 4/1957 | Williamson | 219—10.79 |

JOSEPH V. TRUHE, Primary Examiner

L. H. BENDER, Assistant Examiner

U.S. Cl. X.R.
219—10.75